United States Patent Office 3,001,992
Patented Sept. 26, 1961

---

3,001,992
NEW SERIES OF N-(5-NITRO-2-FURFURYLIDENE)-AMINOHETEROCYCLES
Elizabeth A. Bellamy, Belleville, N.J., and Kenyon J. Hayes and Julian G. Michels, Norwich, N.Y., assignors to The Norwich Pharmacal Company, Norwich, N.Y., a corporation of New York
No Drawing. Filed Nov. 17, 1958, Ser. No. 774,112
6 Claims. (Cl. 260—240)

This invention relates to a new series of chemical compounds which have exhibited a high order of in vivo chemotherapeutic effectiveness against microbial infections upon oral administration. The series includes a number of closely related N-(5-nitro-2-furfurylidene)-aminoheterocycles which may be represented by the formula:

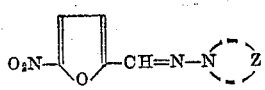

wherein Z represent the atoms which are necessary to complete a six membered heterocyclic ring selected from the group consisting of 2-piperidone, hydrouracil, tetrahydro-2(1)-pyrimidone, morpholine, piperidine and 4-methyl piperazine.

We have discovered that the members of our new series of compounds are potent and valuable chemotherapeutic agents in the treatment of subjects infected with a variety of pathogenic microorganisms. Our compounds administered orally to animals infected with *Salmonella typhosa*, *Micrococcus pyogenes* var. *aureus*, *Syphacia obvelata* or *Eimeria tenella* organisms have proved successful in ameliorating and preventing morbidity and mortality provoked by such organisms. Our new compounds have exhibited the further surprising property of combatting *Trichomonas vaginalis* effectively when administered per os.

The amount of our compounds necessary to effect a therapeutic result is well tolerated without manifestation of toxic or undesirable response. When fed to mice infected with *Salmonella typhosa*, *Micrococcus pyogenes* var. *aureus*, *Syphacia obvelata* or *Trichomonas vaginalis* organisms at a dose within the range of 50–250 mg./kg. cures obtained, in percent, were 80, 100, 90, and 90, respectively. When incorporated in the feed supply of chickens exposed to infection by *Eimeria tenella* at the low level of 0.011%, protection against the ravages of coccidiosis produced by that parasite was secured.

In mice the $LD_{50}$ of our compounds is within the range of 400–2200 mg./kg. In chickens adverse effects due to the presence of our compounds in their feed have not been observed.

While the various members of our new series of compounds are distinguished by their effectiveness as chemotherapeutic agents, they differ from each other somewhat in degree of chemotherapeutic activity and the one which we now prefer to employ is N-(5-nitro-2-furfurylidene)-3-aminotetrahydro-2(1)-pyrimidone. The members of our new series can be readily compounded in appropriate pharmaceutical dosage forms for oral administration. Such forms are represented by tablets, powders, capsules and suspensions wherein excipients common to pharmaceutical practice are employed. They are also readily used in the treatment of diseases of domestic animals by incorporation in the feed supply and thus are peculiarly valuable in the field of veterinary medicine.

The method which we now prefer to follow in preparing the members of our new series comprises condensing the appropriate N-aminoheterocycle with 5-nitro-2-furfural or a derivative thereof capable of yielding that substance upon hydrolysis, readily effected in the presence of acid.

In order that our invention may be entirely available to those skilled in the art, methods for making members of our series of new compounds are described briefly:

EXAMPLE I

*N-(5-nitro-2-furfurylidene)-3-aminotetrahydro-2(1)-pyrimidone*

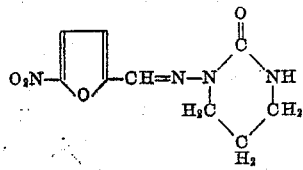

A solution of 7.0 g. (0.07 mole) of tetrahydro-2(1)-pyrimidone in 200 cc. of 2 N sulfuric acid is cooled at 3–4° C. while 4.9 g. (0.071 mole) of solid sodium nitrate are added during 6 minutes. Stirring is continued for about 5 hours. During 10 minutes, 10 g. (0.153 mole) of zinc dust are added at 15–20° C. Stirring is continued for 30 minutes; then the excess zinc is filtered. A solution of 10 g. of 5-nitro-2-furfural dissolved in ethanol is added and the yellow precipitate which forms is removed by filtration. After washing with water, alcohol, ether and drying, the product weighs 12.1 g. (73%) and melts at 238–245° C. Recrystallization from nitromethane raises the melting point to 242.5–244.5° C.

Instead of 5-nitro-2-furfural, 5-nitro-2-furaldehyde diacetate may be used. When it is employed, heat is supplied to the mixture to raise the temperature to about 75–85° C. for a brief time to effect its hydrolysis.

EXAMPLE II

*N-(5-nitro-2-furfurylidene)-1-amino-2-piperidone*

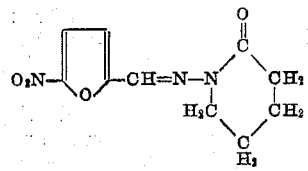

A solution of 65 g. (0.657 mole) of 2-piperidone in 250 cc. of glacial acetic acid is cooled in ice while dried "nitrous gases" (generated from sodium nitrite and sulfuric acid) are passed in until saturated (about 12 hours). The resulting solution is placed under vacuum to remove excess nitrogen oxides and then poured onto ice. Zinc dust is added in small portions until the yellow color disappears. Stirring is continued for an additional hour. The excess zinc is filtered and the aqueous solution treated with 25 g. of 5-nitro-2-furfural dissolved in ethanol. The yield of product, melting at 232–233° C., is 17 g. (11%). Recrystallization from 1:1 nitromethane:ethanol raises the melting point to 234–235° C.

EXAMPLE III

*N-(5-nitro-2-furfurylidene)-1-aminohydrouracil*

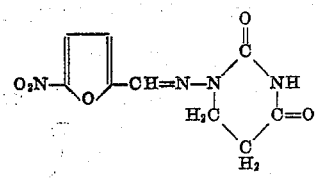

(A) 1-AMINOHYDROURACIL HYDROCHLORIDE

A solution of 7 g. (0.0476 mole) of 2-semicarbazidopropionic acid dissolved in 39 g. of 25% hydrochloric acid is heated at 75–80° C. for 45 minutes. The reaction mixture is cooled below 10° C. for 30 minutes after which the product is filtered and washed with a small amount of isopropyl alcohol. There are obtained 7 g. (89%) of a product having an indeterminate melting point. This product is recrystallized from dilute ethanol.

(B) N-(5-NITRO-2-FURFURYLIDENE)-1-AMINO-HYDROURACIL

To an aqueous solution of 1 g. (0.006 mole) of 1-aminohydrouracil hydrochloride, obtained in A, is added a solution of 0.85 g. of 5-nitro-2-furfural dissolved in ethanol. The yellow precipitate which forms is filtered and washed with alcohol and ether, giving 1.3 g. (86.6%) of N-(5-nitro-2-furfurylidene)-1-aminohydrouracil. After recrystallization from dimethylformamide it melts at 280° C.

EXAMPLE IV

N-(5-nitro-2-furfurylidene)-1-amino-4-methyl piperazine

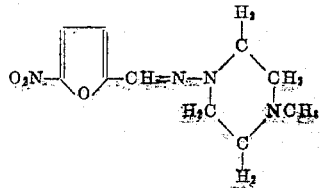

(A) N-NITROSO-4-METHYL PIPERAZINE

To a solution of 200 g. (2 moles) of 4-methyl piperazine in 2000 ml. of 2 N sulfuric acid is added a solution of 160 g. (2.32 moles) of sodium nitrite dissolved in 300 ml. of water during two hours at 55–60° C. After an additional ½ hour, the solution is cooled. To this solution is added 400 ml. of 20% sodium hydroxide to bring the pH to about 8.4. The solution is extracted ten times with 100 ml. portions of chloroform. After drying and removing the chloroform in vacuo, the residue is distilled through a Vigreux column. The yield of yellow liquid boiling at 76° C. (1.5 mm.) is 151 g. (58.6%).

(B) N-(5-NITRO-2-FURFURYLIDENE)-1-AMINO-4-METHYL PIPERAZINE

In a 5 l. flask equipped with a stirrer, a reflux condenser with drying tube, a thermometer, and a dropping funnel are placed 45 g. (1.2 moles) of lithium aluminum hydride. Anhydrous ether (1200 ml.) is added and the suspension stirred and refluxed for one hour.

After cooling to 5° C. a solution of 110 g. (0.85 mole) of N-nitroso-4-methyl piperazine in 500 ml. of anhydrous ether is added at such a rate that the temperature does not exceed 10° C. After stirring an additional hour, 300 ml. of ether are added slowly and then 125 ml. of water are added dropwise at 6–22° C. during 20 minutes. The white solid is filtered, collected, and washed by slurrying with ether. The ether is evaporated and the residue treated with 400 ml. of water. After the addition of 100 ml. of acetic acid, the pH is 4.5. A solution of 120 g. (0.85 mole) of 5-nitro-2-furfural in 250 ml. of ethanol is added at 45° C. After standing one hour, the solution is extracted with ether two times. Then, 210 ml. of sodium carbonate solution (100 g. monohydrate in 200 ml. water) are added and the N-(5-nitro-2-furfurylidene)-1-amino-4-methyl piperazine precipitates. After cooling for one hour, the material is collected on a filter and washed with water. There are 105 g. of dark brown material. Recrystallization from isopropanol (ca. 10 ml. per gram) yields 60 g. (30%) of orange crystals, M.P. 118–119° C.

EXAMPLE V

N-(5-nitro-2-furfurylidene)-1-aminomorpholine

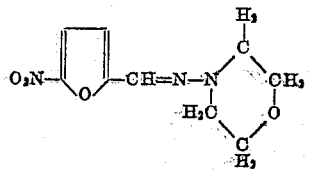

(A) N-NITROSOMORPHOLINE

In a 1 l. flask fitted with a stirrer, thermometer, and reflux condenser are placed 87 g. (1 mole) of morpholine and 550 ml. of 2 N sulfuric acid. The solution is heated on the steam bath to 60° C. and a solution of 79 g. (1.15 moles) of sodium nitrite in 150 ml. of water is added during two hours at 60–65° C., after which the heating is continued for one hour.

(B) N-(5-NITRO-2-FURFURYLIDENE)-1-AMINO-MORPHOLINE

The cooled nitrosation mixture is added to 3500 ml. of 2 N sulfuric acid in a 12 l. flask equipped with a stirrer and a thermometer. Then 155 g. (2.37 moles) of zinc dust are added portionwise to the stirred solution at such a rate as to keep the temperature below 20° C. This addition requires about one hour. After stirring an additional thirty minutes, the excess zinc is filtered. Then 141 g. (1.0 mole) of 5-nitro-2-furfural are dissolved in one liter of ethanol, and one-third of this is added to the amine solution at 40° C. After crystallization begins, the remainder of the solution is added and the mixture stirred one-half hour at 45° C., then cooled to 5–10° C. for two hours, filtered, and washed with water. The crystals are dissolved in 2500 ml. of hot isopropanol. To the hot solution are added about 10 g. of decolorizing charcoal. After stirring briefly, the mixture is filtered and washed with 500 ml. of hot isopropanol. The orange crystals obtained are dried. The yield of N-(5-nitro-2-furfurylidene)-aminomorpholine is 172 g. (76.5%); M.P. 119–120° C.

EXAMPLE VI

N-(5-nitro-2-furfurylidene)-1-aminopiperidine

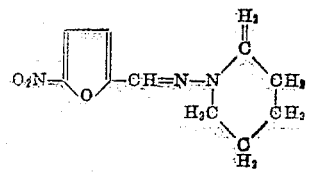

(A) N-NITROSOPIPERIDINE

To a solution of 198 ml. (170 g., 2 moles) of piperidine in 1000 ml. of 2 N sulfuric acid is added a solution of 160 g. (2.32 moles) of sodium nitrite in 300 ml. of water during two or three hours at 55–65° C. The pH gradually rises during the reaction from an initial pH of 3.1 to a pH of 5.0 after most of the nitrite has been added. Two 5 ml. portions of 2 N sulfuric acid are added towards the end of the reaction to maintain the pH below 5. After the nitrite addition is complete, the solution is stirred an additional hour at 50–60° C. The cooled solution is extracted three times with 100 ml. portions of chloroform. The chloroform solution is dried, the chloroform removed, and the residue distilled in vacuo. There are obtained 209 g. (92% yield) of nitrosopiperidine, boiling at 61° C. (at 1 mm.) to 67° C. (at 1.5 mm.).

(B) N-(5-NITRO-2-FURFURYLIDENE)-1-AMINO-PIPERIDINE

In a 12 l. flask fitted with a stirrer and thermometer are placed 184 g. (1.615 moles) of nitrosopiperidine and 5800 ml. of 2 N sulfuric acid. The solution is cooled to 15° C. in an ice-water bath. Then 250 g. (3.82 moles) of zinc dust are added portionwise with stirring, at such a rate as to keep the temperature below 20° C. This requires about one and one-half hours. The excess zinc dust is filtered. To the filtrate are added 1500 ml. of ethanol. A solution of 240 g. (1.70 moles) of 5-nitro-2-furfural in 1750 ml. of ethanol is added. The mixture is stirred for about one-half hour at room temperature and then cooled two to three hours in an ice-bath. The orange needles are filtered and washed well with water. After air-drying and drying two hours at 60° C., the yield of N-(5-nitro-2-furfurylidene)-1-aminopiperidine is 281 g. (77.4%); M.P. 89–90.5° C.

What is claimed is:
1. The compounds having chemotherapeutic activity on oral administration of the formula:

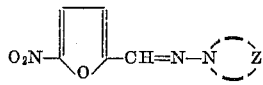

in which Z represents the atoms which are necessary to complete a six-membered heterocyclic ring selected from the group consisting of 2-piperidone, hydrouracil, tetrahydro-2(1)-pyrimidone, morpholine, piperidine and 4-methyl piperazine.

2. N-(5-nitro-2-furfurylidene-3-aminotetrahydro - 2(1)-pyrimidone.
3. N-(5-nitro-2-furfurylidene)-1-amino-2-piperidone.
4. N-(5-nitro-2-furfurylidene)-1-aminohydrouracil.
5. N-(5-nitro-2-furfurylidene)-1-aminomorpholine.
6. N-(5-nitro-2-furfurylidene)-1-aminopiperidine.

References Cited in the file of this patent
UNITED STATES PATENTS

| | | |
|---|---|---|
| 2,702,292 | Hayes | Feb. 15, 1955 |
| 2,746,960 | Gever et al. | May 22, 1956 |
| 2,798,068 | Gever | July 2, 1957 |

FOREIGN PATENTS

| | | |
|---|---|---|
| 759,378 | Great Britain | Oct. 17, 1956 |
| 1,063,601 | Germany | Aug. 20, 1959 |

OTHER REFERENCES

Richter: "Organic Chemistry," volume III, pages 3 to 5, P. Blakiston's Sons & Co., 1923.

Derwent Belgian Patents Report, vol. 63A, page A23 (Mar. 25, 1960).